United States Patent [19]

Johnson

[11] 4,261,223

[45] Apr. 14, 1981

[54] POWER TRANSMISSION ASSEMBLY

[76] Inventor: Kenneth M. Johnson, 457 Overbrook Dr., NW., Atlanta, Ga. 30318

[21] Appl. No.: 949,016

[22] Filed: Oct. 6, 1978

[51] Int. Cl.³ .............................................. G05G 1/14
[52] U.S. Cl. .................................... 74/594.2; 74/437; 74/393
[58] Field of Search ...................... 74/394, 437, 594.2, 74/594.3, 750 B, 393

[56] References Cited

U.S. PATENT DOCUMENTS

| | | | |
|---|---|---|---|
| 2,131,288 | 9/1938 | Kirkpatrick | 74/437 |
| 2,143,236 | 1/1939 | Birk | 74/437 |
| 2,482,811 | 9/1949 | Traumuller | 74/437 |
| 2,552,572 | 5/1951 | Mikina | 74/437 |
| 3,769,946 | 11/1973 | Scherrer | 74/437 |

Primary Examiner—Kenneth Dorner
Attorney, Agent, or Firm—Newton, Hopkins & Ormsby

[57] ABSTRACT

A pedal powered gear transmission mechanism applicable to velocipedes, exercise machines or winches is disclosed. A system of non-circular gears or a combination of non-circular and circular gears between pedal cranks and a chain driving sprocket causes the pedal cranks to retard and advance cyclically relative to the chain sprocket by varying the instantaneous gear ratio between the pedal cranks and chain sprocket. The resulting change in mechanical advantage partially compensates for the inherent disadvantage at and near dead center pedal positions. A more uniform application of torque is developed.

8 Claims, 7 Drawing Figures

POWER TRANSMISSION ASSEMBLY

BACKGROUND OF THE INVENTION

The greatly increased use of bicycles, pedal-operated exercisers and the like has led to a strong demand for better and more efficient drives for such devices. The traditional direct drive on bicycles between pedal cranks and the chain driving sprocket has the inherent disadvantage of unequal torque development at and near pedal crank dead center positions. At such positions, downward thrust on the pedals is substantially diminished as is the production of torque at the chain drive wheel or sprocket, and this is a cyclical condition in standard bicycle drives and the like.

It is the objective of the invention to overcome this problem of non-uniform torque development in drives for bicycles and similar machines to the greatest possible degree. More particularly, it is the aim of the invention to cause the pedal cranks to retard and advance with respect to the chain driving sprocket by varying the instantaneous gear ratio between the pedal cranks and chain sprocket. This cyclical change in gear ratio and resulting mechanical advantage partially compensates for the inherent cyclical disadvantage at and near pedal crank dead center positions. By means of the invention, a much more uniform torque is developed at the chain driving sprocket.

In the invention, the variations in mechanical advantage repeat twice within the cycle of one complete revolution, and the pedal cranks complete the same number of revolutions as does the chain wheel or sprocket over a given period of time.

The construction of the invention is such that simple or complex non-circular gears may be used to generate the desired cyclical changes in mechanical advantage. The center-to-center distance between the gear shafts remains constant and the instantaneous sum of the effective pitch radii of the gears at the point of engagement will equal this center distance. The ratio of the instantaneous pitch radii determines the instantaneous mechanical advantage of the gear set. The product of this instantaneous ratio and that of the other gear set determines the overall ratio. If the gears are identical, the square root of the overall ratio is accomplished in each gear set. In a complete revolution, the pedal cranks will cycle through a speed ratio of:

1:1—same
>1:1—advance
1:1—same
<1:1—retard
1:1—same
>1:1—advance
1:1—same
<1:1—retard
1:1—same (starting point)

relative to the chain wheel.

To satisfy the requirements for disclosure of known prior art under 37 C.R.F. 1.56, the following United States patents are made of record herein: U.S. Pat. Nos. 540,189 550,206 623,863 653,873 703,613 2,184,049 3,865,366 3,899,932.

Also, the following article is made of record: "The Effects of Circular and Elliptical Chainwheels on Steady-Rate Cycle Ergometer Work Efficiency", Henderson et al., *Medicine and Science in Sports*, Vol. 9, No. 4, pp. 202-207 (1977).

DETAILED DESCRIPTION OF PREFERRED EMBODIMENTS

Figure 1:
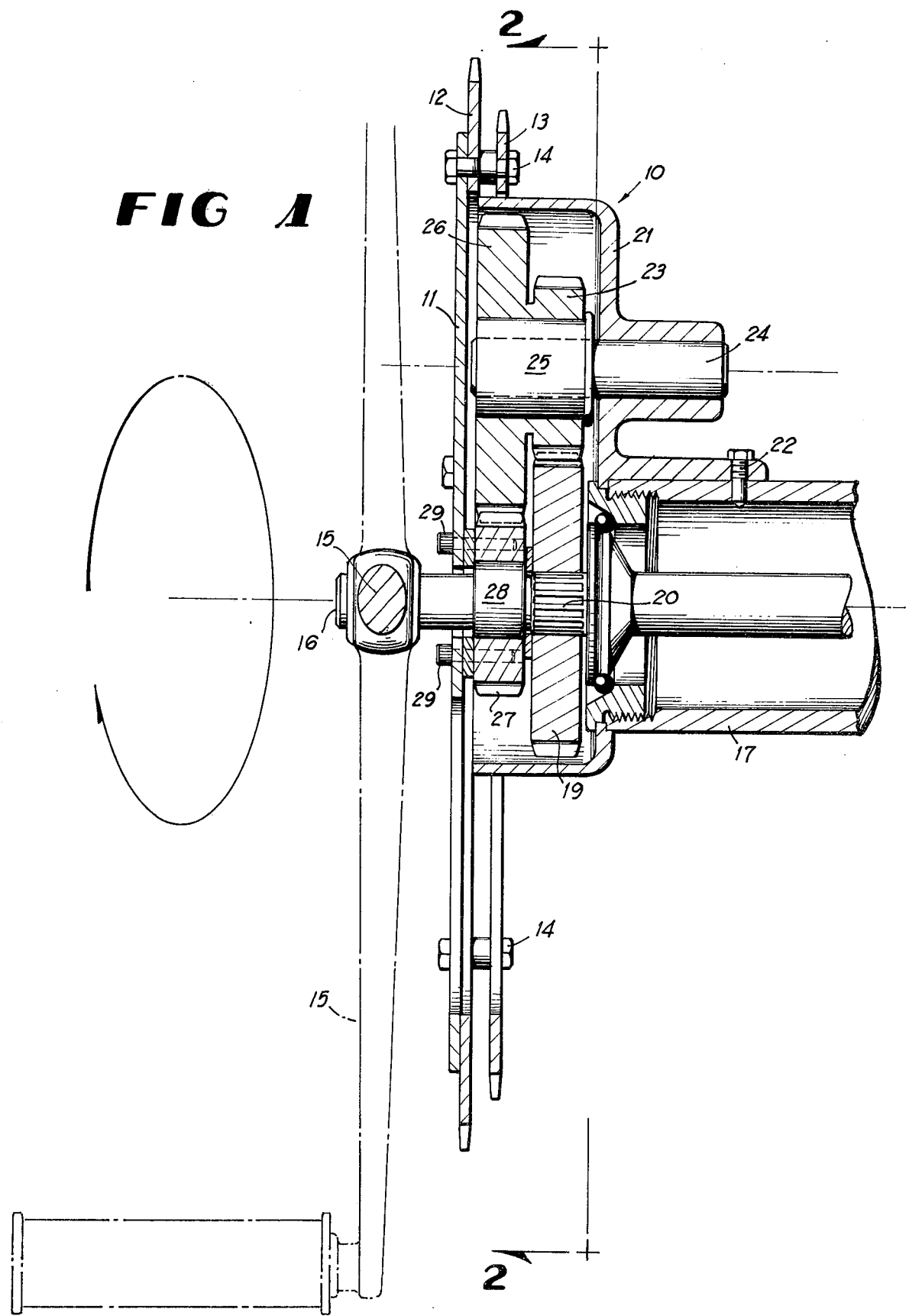
FIG. 1 is a central vertical cross section taken through a pedal powered gear transmission assembly according to an embodiment of the invention.

Referring to FIG. 1 initially wherein like numerals designate like parts, a gear transmission 10 is disclosed for use with 10-speed derailleur bicycles, but not limited to such usage. As noted previously, the invention is applicable to vehicles, exercise machines, winches, and other like devices powered by humans. The transmission may also be adapted to other multi-speed bicycles by changing the number of chain sprockets in the assembly.

In the illustrated embodiment, FIG. 1, a front spider plate 11 mounts two chain driving sprockets 12 and 13 secured rigidly to the spider plate 11 by fastener means 14. The larger outer sprocket 12 may have fifty-two teeth, for example, and the smaller inner sprocket 13 may have thirty-nine teeth. This sprocket assembly is connected through a chain, not shown, engaged with either sprocket 12 or 13, with an assembly consisting of five smaller sprockets, not shown, secured to the rear axle of the bicycle. This is the customary drive arrangement for 10-speed bicycles and constitutes a prime application of the invention, but the invention is not limited to this application, as stated.

One pedal crank arm 15 is secured to a spindle 16 which extends transversely through a hub 17 of the bicycle frame. A second and opposite side pedal crank 18 shown only in FIGS. 4 to 7 in phantom lines is fixed to the opposite end of spindle 16.

A first non-circular gear 19, such as an elliptical gear, is splined at 20 at the spindle 16 inside of a housing 21 which is locked to the frame hub 17 by a screw 22 through which torque is transmitted during operation of the transmission. The first gear 19 is in mesh with a second elliptical gear 23 ninety degrees out of phase with the first gear 19 and being freely rotatably mounted on a jackshaft 24 supported on the housing 21 through a suitable bearing 25. The spindle 16 and jackshaft 24 have parallel axes and, for the bicycle application shown, the jackshaft is spaced above the spindle 16.

Figure 2:
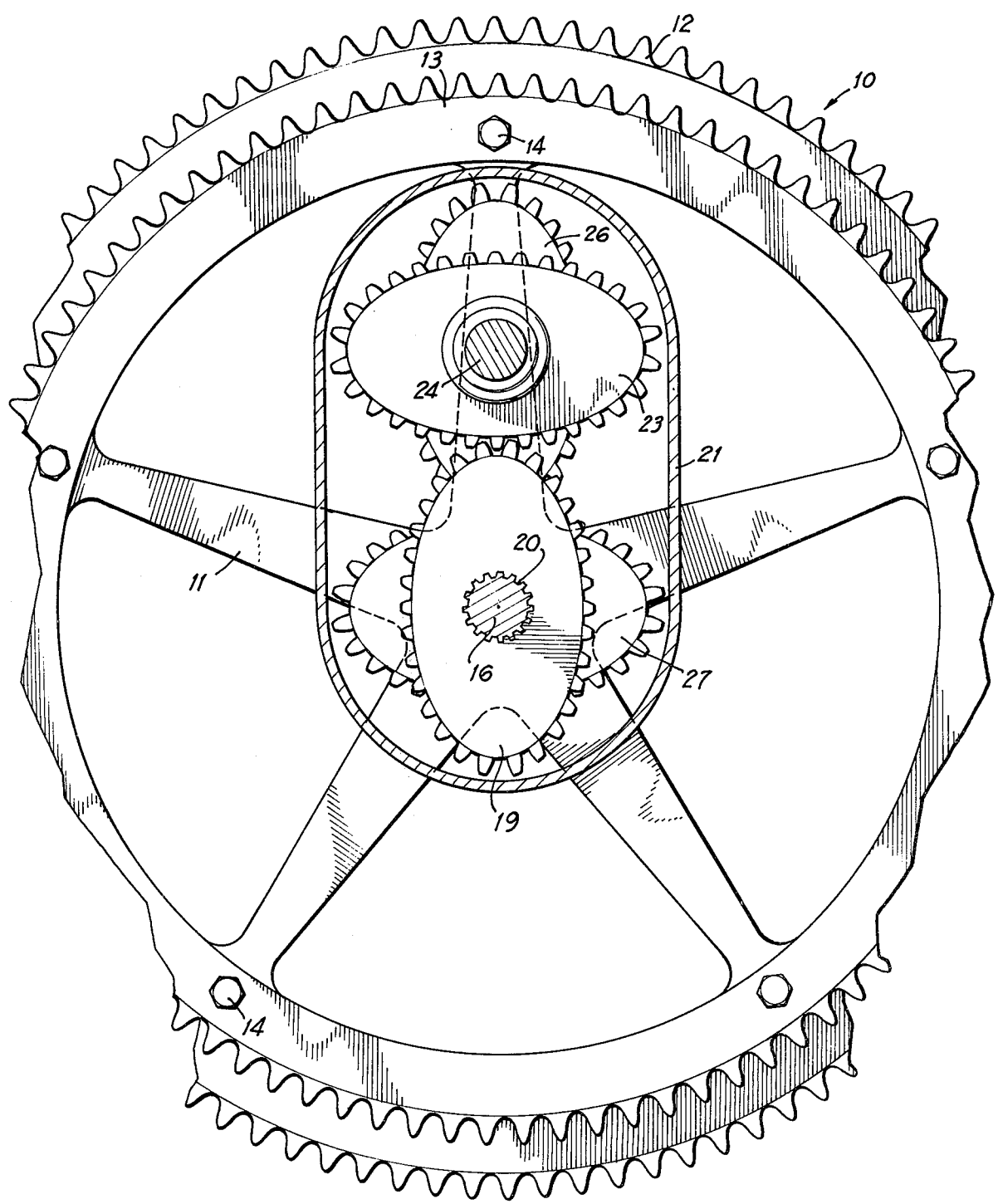
FIG. 2 is a transverse vertical section taken on line 2—2 of FIG. 1.

A third non-circular or elliptical gear 26 integral with the second gear 23 and turning therewith freely on the jackshaft is ninety degrees out of phase with the second gear 23 and in phase with the first gear 19, FIG. 2. The third gear 26 meshes with a fourth elliptical gear 27 ninety degrees out of phase therewith and being mounted on the spindle 16 through a bearing 28. The fourth gear 27 is fixed to the spider 11 by screws 29 and thus rotation of the fourth gear 27 drives the spider and chain sprockets 12 and 13. The fourth gear 27 can rotate relative to the spindle 16. The input and output gears 19 and 27 are coaxial and the gross rotation is the same.

Assuming a constant output speed through the fourth gear 27, the input speed through the first gear 19 will vary through two cycles during each revolution of the spindle 16. As depicted in FIGS. 4-7 which schematically illustrate one-half of a complete revolution and which show input gear 19 and second gear 23, the input will cycle through points of identical speed, faster and slower than the output speed. The precise pattern is determined by the shape of the gear pitch paths which need not be elliptical, as illustrated, but may sometimes have other non-circular shapes. The fourth or output gear 27 will oscillate freely on the spindle 16 during the cyclic operation of the transmission.

The overall ratio between the lowest input speed through the gear 19 and the fastest output speed through the gear 27 is equal to the product of the ratios achieved in each gear set. Thus, the ratio within a set is the square root of the overall ratio. The minor elliptical axis of the second gear 23 is aligned with the major axis of integral gear 26 to maintain this feature. Variations in the overall pattern and effect can be achieved by changing the angular relationships of the gear axes. The pedal crank arm 15 is fixed at a position substantially perpendicular to the major axis of gear 19 to achieve the desired timing of the gear ratio changes within the revolution cycle. The final result of this geometry is a nearly level torque curve throughout a complete cycle or revolution, as distinguished from the customary fluctuating torque curve of the prior art.

Figure 3:
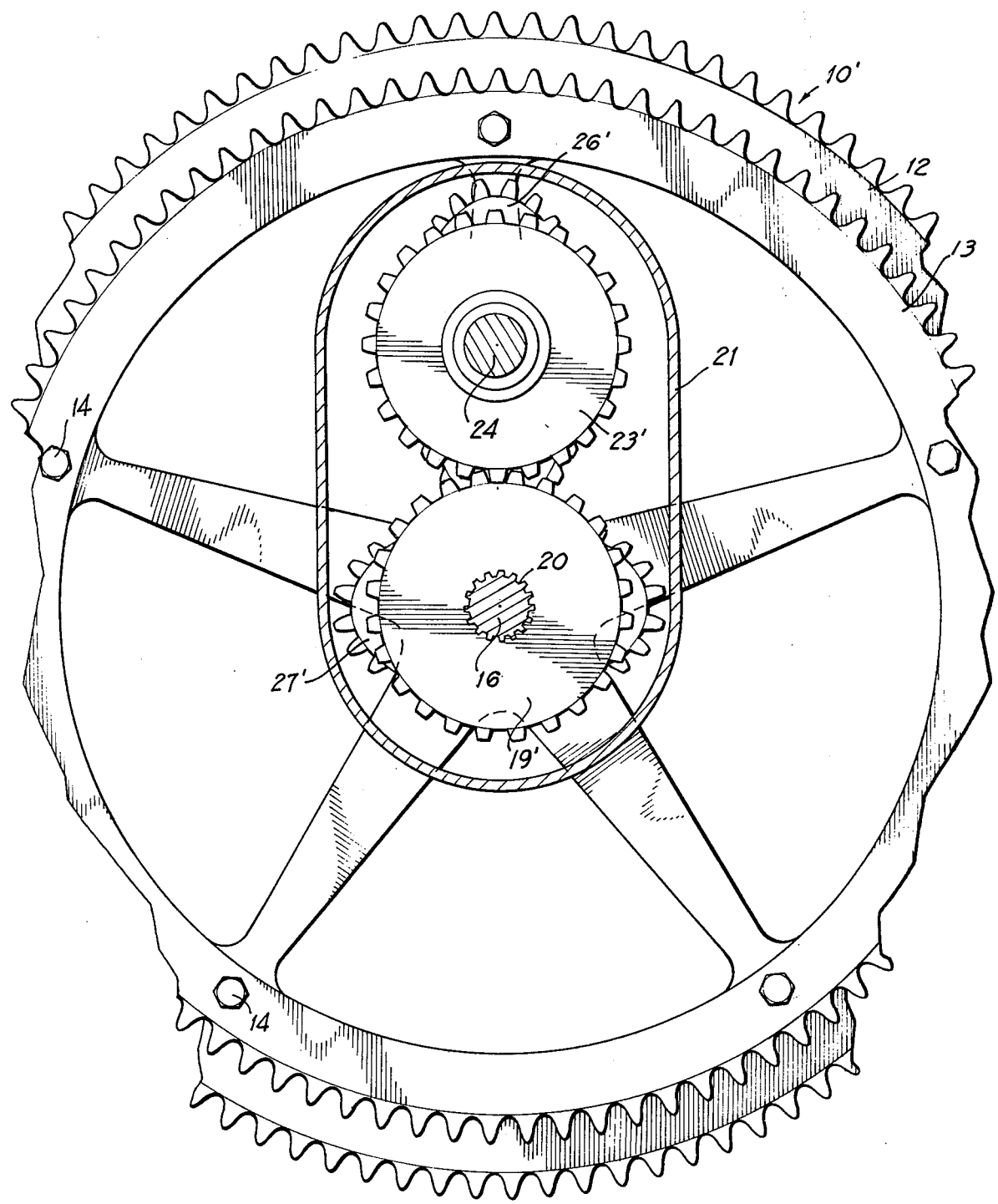
FIG. 3 is a view similar to FIG. 2 showing a second embodiment of the invention.

The embodiment of FIG. 3 illustrates a transmission 10' wherein only the gears 26' and 27' are non-circular or elliptical. These gears correspond to the third and fourth gears 26 and 27 of the prior embodiment. The other two gears 19' and 23' in FIG. 3 are circular gears and this set of gears corresponds to the gears 19 and 23 of the prior embodiment. All other parts of the mechanism are identical to those previously described, and the purpose of the invention in FIG. 3 and its operational mode is unchanged.

Figure 4:
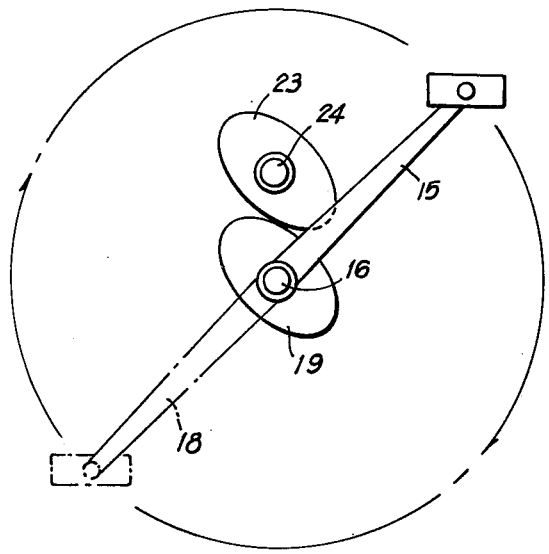
FIGS. 4 through 7 are diagrammatic views of pedal driven non-circular gears illustrating mechanical advantage gained at pedal dead center and changing gear ratio.
Figure 5:
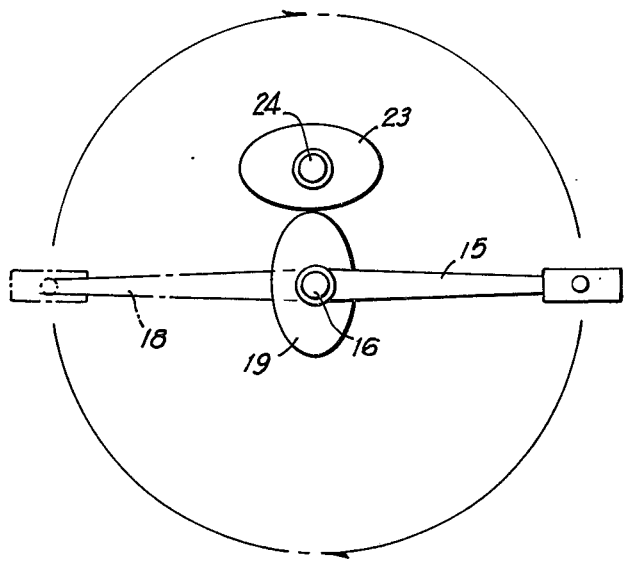
Figure 6:
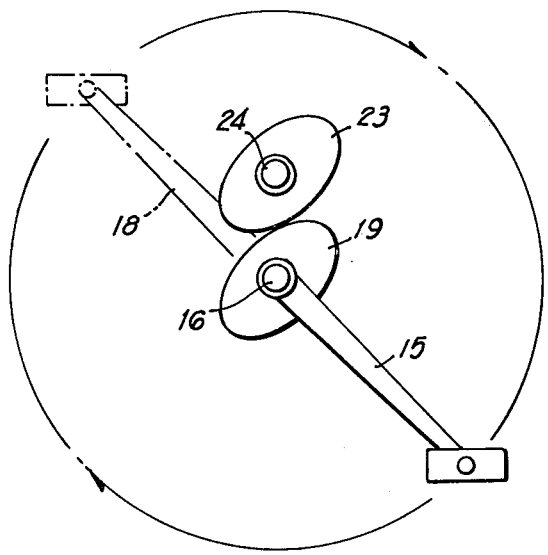
Figure 7:
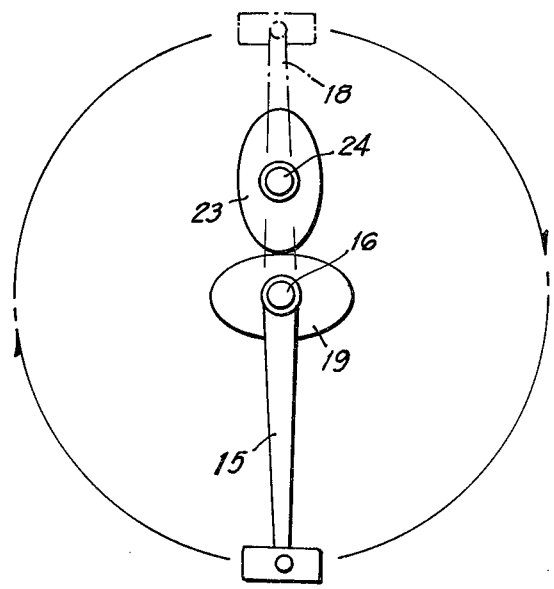

The diagrams in FIGS. 5 and 7 illustrate the mechanical advantage obtained by having at least one set of elliptical gears in the system. FIGS. 4 and 6 show a 1:1 ratio of these gears occurring at intermediate crank positions.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a power transmission assembly, cranking means, a support for the cranking means, gearing including at least a pair of meshing non-circular gears and further including a gear secured to the cranking means to turn therewith and forming the power input gear for said gearing, support and enclosing means for said gearing, a shaft on said support and enclosing means, a power output gear formed from one of said non-circular gears, and being rotatively mounted on said craning means, a gear rotatably mounted on said shaft in meshing relationship with said power input gear and being rigidly connected to the other of said pair of non-circular gears, and chain drive means fixed to the power output gear, said pair of meshing non-circular gears being elliptical gears which are ninety degrees out of phase with each other.

2. In a power transmission assembly as defined in claim 1, said gearing including two meshing pairs of elliptical gears with the gears in each pair being ninety degrees out of phase with each other.

3. In a power transmission assembly as defined in claim 2, and said cranking means comprising pedal operated crank arms, a rotary spindle connected with and turned by said crank arms, and one gear of said gearing being secured to said rotary spindle.

4. In a power transmission assembly as defined in claim 3, and said support comprising a vehicular frame, and said support and enclosing means being a housing for said gearing.

5. In a power transmission assembly as defined in claim 4, and said support and enclosing means having a torque reactive connection with said support.

6. In a power transmission assembly as defined in claim 5, and said vehicular frame having a hub within which said rotary spindle is journaled, said housing including a part engaging the exterior of said hub, and a fastener element interconnecting said part and said hub and forming said torque reactive connection.

7. In a power transmission assembly as defined in claim 6, and said vehicular frame comprising a bicycle frame, and said chain drive means fixed to said power output gear including at least a single chain driving sprocket.

8. A power transmission assembly, comprising, a housing for said assembly, a spindle on said housing, a first elliptical gear on said spindle, a shaft on said housing in parallel relationship to said spindle, a second elliptical gear rotatively mounted on said shaft in meshing relationship with said first gear, a third elliptical gear rigidly joined to said second gear for rotatively movement about said shaft, and a fourth elliptical gear rotably mounted on said spindle in meshing relationship to said third gear, power input means connected to said spindle, power output means connected to said fourth gear and wherein said gears are ninety degrees out of phase with the gear to which they are in meshing relationship.

* * * * *